(No Model.)
M. L. LANE.
FERTILIZER ATTACHMENT AND INSECT EXTERMINATOR FOR CORN PLANTERS.
No. 266,037. Patented Oct. 17, 1882.
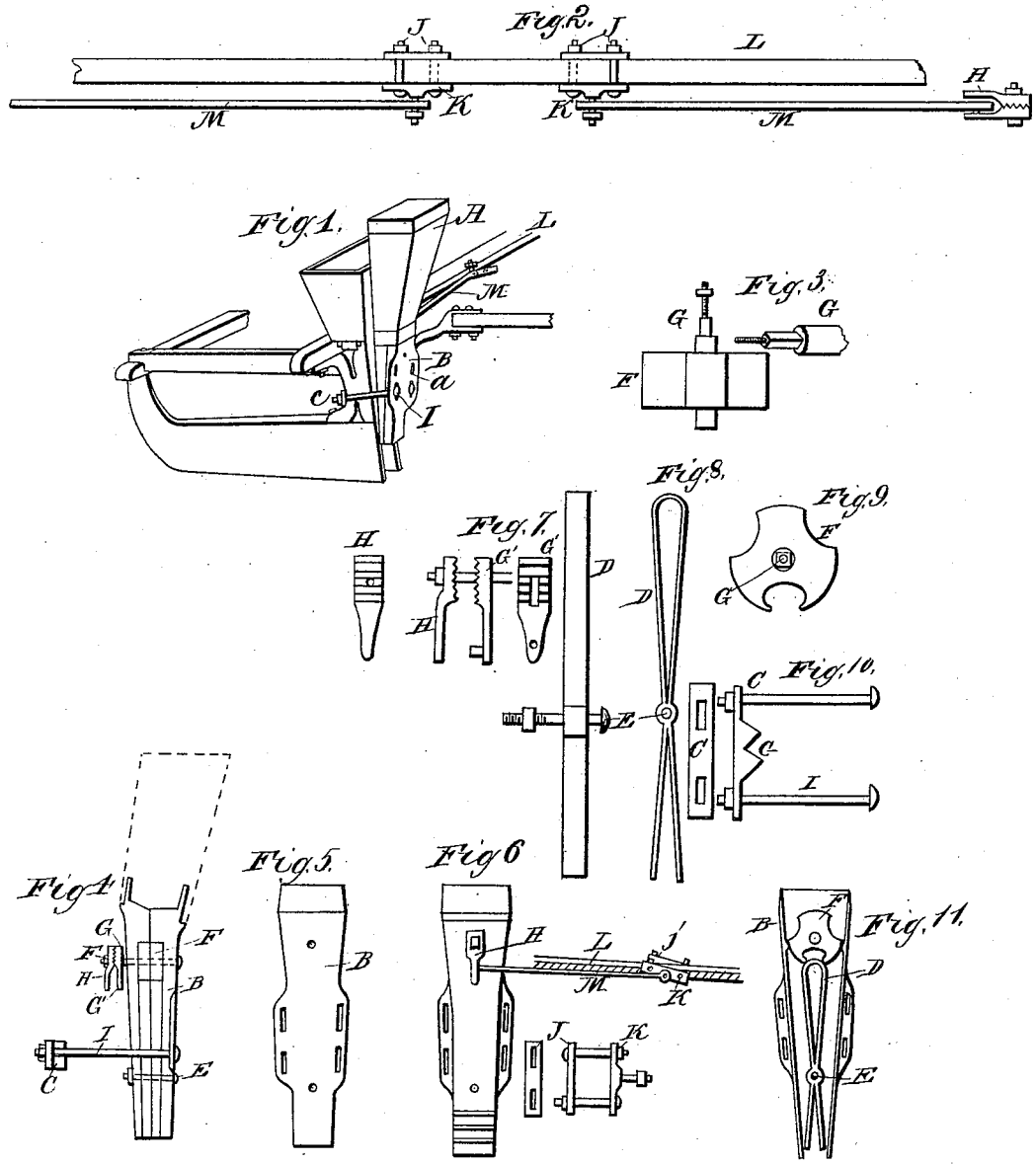

UNITED STATES PATENT OFFICE.

MILTON L. LANE, OF MARENGO, IOWA, ASSIGNOR OF ONE-HALF TO ALEX. SCOTT, OF SAME PLACE.

FERTILIZER ATTACHMENT AND INSECT-EXTERMINATOR FOR CORN-PLANTERS.

SPECIFICATION forming part of Letters Patent No. 266,037, dated October 17, 1882.

Application filed June 12, 1882. (No model.)

*To all whom it may concern:*

Be it known that I, M. L. LANE, a citizen of the United States, residing at Marengo, in the county of Iowa and State of Iowa, have invented certain new and useful Improvements in Fertilizer Attachments and Insect-Exterminators for Corn-Planters, of which the following is a specification, reference being had therein to the accompanying drawings, and in which—

Figure 1 is a detailed perspective view of my improvement in fertilizer attachments and insect-exterminators, and Figs. 2, 3, 4, 5, 6, 7, 8, 9, 10, and 11 are details thereof.

This invention pertains to a combined fertilizer attachment and insect-exterminator for corn-planters; and it consists in the combination, construction, and arrangement of parts, substantially as hereinafter more fully set forth and claimed.

In carrying out my invention I employ a chute, B, upon which is superposed a hopper, A, holding the fertilizer or insect-exterminating substance. The chute is connected to the corn or seed dropper of the planter by rods I I, passed through and nutted on the rear side of holes $a$, of which there are two sets, one arranged above the other in the side extensions of the chute, and through a clamp, $c$. This clamp, which has preferably two teeth or ribs, bears against the front side of the dropper, and above a forward extension or flange thereof. The ends of the rods or bolts I passed through the clamp-bar $c$ are also nutted. There are two sets of slots, $a$, one set of which, in addition to being arranged above the other, is also arranged out of line therewith, to enable a vertical and also a lateral adjustment of the chute, to permit the dropping of the fertilizer or insect-exterminating powder, either upon hills of corn or at one side thereof.

F is the fertilizer-dropper, hung about at its center, in the upper part of the chute B, upon a shaft, G.

G' is a crank-arm, slipped upon an angular portion of said shaft, and having a serrated or toothed surface, and the pitman M slipped upon the crank-pin at its outer end.

H is a notched or toothed washer, also slipped upon the angular part of the shaft G, with its toothed surface adjusted in contact with that of the crank-arm G' and its arm against the crank-pin of the crank-arm G', thus securing the pitman in position thereon, as clearly shown. This arrangement enables the adjustment of the crank-arm G' of the dropper-shaft to accommodate the stroke of any length of check-bar of the different forms of planters in use. The dropper F has two cavities or cells in the upper side—one on each side—to conveniently receive and drop the required quantity of fertilizer or insect-exterminating powder at one operation.

D is the cut-off, which consists, in the main, of a spring-metal plate bent or formed into a loop at its upper end, which fits into a recess in the lower side of the dropper F, while its downward-projecting portions may cross each other about at a point a little below its middle, causing its lower extremities to project on opposite sides, and to rest against the inner sides or walls of the chute B.

L is the check-bar of the corn-planter, to which one end of the pitman M is connected, preferably as shown at J K.

It will be observed that as the dropper F is operated or vibrated by the action of the aforesaid check-bar and pitman, connected to its crank-shaft arm G', the cavities or cells thereof will alternately empty their contents into the chute below said dropper, first on one side and then on the other side of the cut-off D. It will be further observed that the action of the dropper F upon the upper looped end of the cut-off will have the effect to press the lower portions or legs of said cut-off alternately against the sides of the chutes, and thus alternately release the opposite legs thereof from the chute, which will permit the alternate dropping from the sides of the cut-off of the fertilizer or insect-exterminating powder, whichever is used, into the ground. The aforesaid operation takes place simultaneously with the planting or dropping operation of the corn, both the corn or seed slide of the planter and the fertilizer-dropper being actuated by the check-bar.

I claim and desire to secure by Letters Patent of the United States—

In a fertilizer and insect-exterminating dropper, the combination, with the chute B, formed with slotted side flanges to receive the adjusting-bolts I, by which the same is bolted to the corn-planter, of the dropper F, having pockets or cavities, the cut-off D, pivoted near the lower extremity of the chute, with its upper end fitted in the lower side of the dropper, its legs bearing against the sides of the chute, and the crank-shaft G, crank-arm G', with toothed surface, toothed washer H, and pitman M, as and for the purpose set forth.

In testimony whereof I affix my signature in presence of two witnesses.

MILTON L. LANE.

Witnesses:
 DAVID HUGHES,
 W. W. LEWIS.